United States Patent
Walker et al.

(10) Patent No.: US 7,412,058 B2
(45) Date of Patent: Aug. 12, 2008

(54) DIGITAL RECEIVER AND METHOD FOR RECEIVING SECURE GROUP DATA

(75) Inventors: Glenn A. Walker, Greentown, IN (US); J. Robert Dockemeyer, Jr., Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 739 days.

(21) Appl. No.: 10/391,107

(22) Filed: Mar. 18, 2003

(65) Prior Publication Data

US 2004/0184614 A1 Sep. 23, 2004

(51) Int. Cl.
*H04L 9/12* (2006.01)
*H04L 9/06* (2006.01)

(52) U.S. Cl. .............. 380/271; 380/270; 380/278; 380/43; 713/152; 713/194

(58) Field of Classification Search ............ None
See application file for complete search history.

(56) References Cited

U.S. PATENT DOCUMENTS

| | | | | |
|---|---|---|---|---|
| 5,195,136 | A * | 3/1993 | Hardy et al. | 380/43 |
| 5,459,304 | A * | 10/1995 | Eisenmann | 235/380 |
| 5,587,575 | A * | 12/1996 | Leitner et al. | 235/384 |
| 5,668,880 | A * | 9/1997 | Alajajian | 370/342 |
| 5,790,784 | A | 8/1998 | Beale et al. | |
| 5,991,609 | A | 11/1999 | Marrah et al. | |
| 6,201,798 | B1 * | 3/2001 | Campanella et al. | 370/326 |
| 6,272,334 | B1 * | 8/2001 | Rao | 455/418 |
| 6,282,294 | B1 * | 8/2001 | Deo et al. | 380/270 |
| 6,556,904 | B1 * | 4/2003 | Larson et al. | 701/33 |
| 6,615,381 | B1 * | 9/2003 | Fukuda et al. | 714/746 |
| 6,978,021 | B1 * | 12/2005 | Chojnacki | 380/202 |
| 2002/0046343 | A1 * | 4/2002 | Deo et al. | 713/189 |
| 2002/0126840 | A1 * | 9/2002 | Robbins et al. | 380/44 |
| 2003/0142826 | A1 * | 7/2003 | Asano | 380/277 |
| 2007/0086593 | A1 * | 4/2007 | Denning et al. | 380/286 |

\* cited by examiner

*Primary Examiner*—Ayaz Sheikh
*Assistant Examiner*—Saoussen Besrour
(74) *Attorney, Agent, or Firm*—Jimmy L. Funke

(57) ABSTRACT

A method and radio receiver are provided for receiving and deciphering RF signals having encrypted data information relevant to the receiver environment. According to one aspect of the present invention, the receiver includes an input for receiving an RF signal having a data stream including a key selector and encrypted data including a message, and a demodulator for demodulating the data stream and outputting encrypted data including the message. The receiver further includes a data decryption circuit including memory for storing one or more groups of decryption keys based on a characteristic of the receiver environment. The data decryption circuit selects a decryption key based on the key selector and decrypts the message based on the selected decryption key.

11 Claims, 5 Drawing Sheets

DIGITAL RECEIVER AND METHOD FOR RECEIVING SECURE GROUP DATA

TECHNICAL FIELD

The present invention generally relates to radio receivers and, more particularly, to the communication and selection of secure data in a digital receiver, such as a digital radio frequency (RF) receiver in a vehicle.

BACKGROUND OF THE INVENTION

Automotive vehicles are commonly equipped with audio radios for receiving broadcast radio frequency (RF) signals and broadcasting audio information to passengers in the vehicle. More recently, satellite based digital audio radio (SDAR) services have become available that offer digital radio service covering a large geographic area, such as North America. Currently, a couple of satellite based digital audio radio services are available in North America, both of which generally employ either geo-stationary orbit satellites or highly elliptical orbit satellites that receive uplinked programming which, in turn, is rebroadcast directly to digital radios in vehicles on the ground that subscribe to the service. Additionally, a number of terrestrial (ground based) transmission repeaters are currently employed in certain areas susceptible to satellite signal blockage to provide a clean and uninterrupted radio signal broadcast. Each vehicle subscribing to the digital service generally includes a digital radio having a receiver and antennas for receiving the satellite and terrestrial signal broadcasts.

The radio receivers are programmed to receive and unscramble the digital data signals, which typically include many channels of digital audio. In addition to broadcasting the encoded digital quality audio signals, the satellite based digital audio radio service may also transmit data within a data bandwidth that may be used for various applications. The additional information may include information about the broadcast, such as song title, artist, and genre of music for display on the radio. The signal may also include further information for other reasons, such as advertising, informing the driver of warranty issues, providing information about the broadcast audio information, and providing news, sports, and entertainment broadcasting, in addition to other information. In addition to providing a general signal transmission to subscribing members, the satellite based digital audio radio service may also make available data bandwidth to certain groups, such as vehicle manufacturers, to provide the ability for the vehicle manufacturer to transmit data to select vehicles. In order to do so, it is generally desirable to be able to target the data communication to specific types of vehicles and/or receivers. Some data may be very sensitive to the vehicle and related systems, thus requiring various levels of security.

There are many secure data communication techniques currently available to encrypt broadcast data, including secure keys, public keys, and public/private key methods. While data encryption techniques are generally employed in various data communication applications, it is desirable to provide for a receiver and method for securely communicating data to selected groups of vehicles and/or receivers in a vehicle.

SUMMARY OF THE INVENTION

In accordance with the teachings of the present invention, a digital radio receiver and method are provided for receiving a signal including a data stream having a key selector and encrypted data including a message and deciphering information relevant to the receiver environment. According to one aspect of the present invention, the receiver includes an input for receiving a signal having a data stream including a key selector and encrypted data including a message. The receiver further includes a data decryption circuit including memory for storing one or more groups of decryption keys based on a characteristic of the receiver environment. The data decryption circuit selects a group key based on the key selector and decrypts the message based on the selected group key.

According to another aspect of the present invention, a method for decrypting an encoded data stream including a key selector and encrypted data including a message in a signal broadcast is provided. The method includes the steps of receiving a signal including a data stream having a key selector and encrypted data including a message, and providing one or more groups of decryption keys based on a characteristic of the receiving environment. The method also includes a step of selecting a group key based on the key selector. The method further includes the step of decrypting the message based on the selected group key. Accordingly, the receiver and method of the present invention advantageously allow for the deciphering of secure information intended for a targeted group of receivers, such as a group of vehicles each equipped with a receiver.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 4 illustrates a data packet including a data message header and encrypted data message;

FIG. 5 is a lookup table for storing a plurality of groups of decryption keys;

DESCRIPTION OF THE PREFERRED EMBODIMENTS

Figure 1:
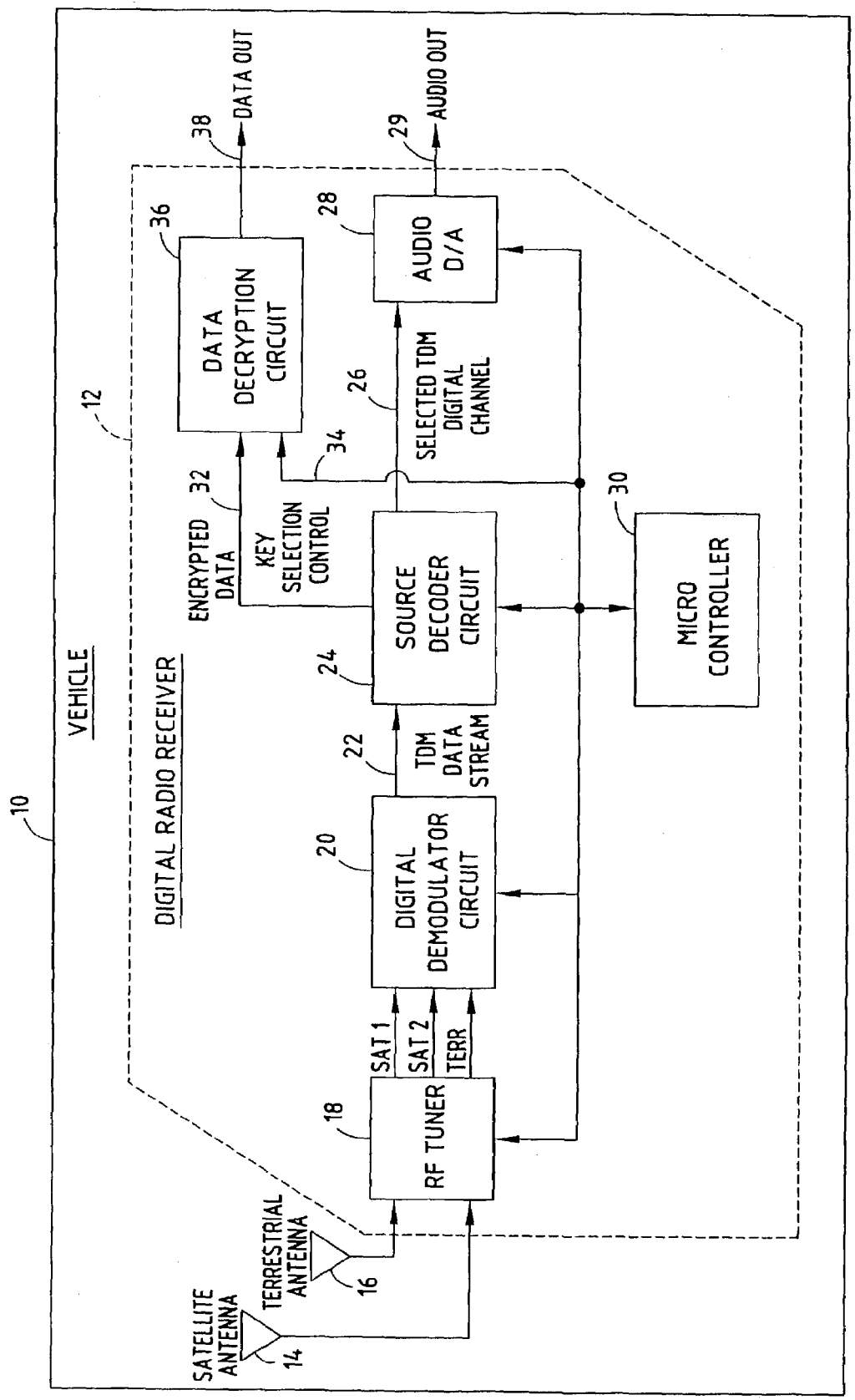
FIG. 1 is a block diagram illustrating a vehicle equipped with a digital radio receiver for receiving RF signals broadcast by a digital audio radio service.

Referring to FIG. 1, a vehicle 10 is generally illustrated having a digital radio receiver 12 for receiving wireless RF signal broadcasts of a satellite based digital audio radio service (SDAR). The vehicle 10 generally includes a satellite antenna 14 for receiving RF signals broadcast from satellite-based transmitters. Additionally, the vehicle 10 is also shown equipped with a terrestrial antenna 16 for receiving RF digital data signals broadcast from terrestrial (ground based) transmitters (repeaters). While satellite and terrestrial based antennas 14 and 16, respectively, are shown and described herein, it should be appreciated that the vehicle 10 may be equipped with one or more antennas for receiving broadcast RF digital data signals from a digital audio radio service that communicates a selector key and encrypted data message as described herein.

The digital radio receiver 12 is programmed to receive and unscramble primary and secondary service digital data signals. The primary service data typically includes the audio service, while the secondary service data typically includes other information. The digital radio receiver 12 include an RF tuner 18 receiving RF signals received by each of satellite antenna 14 and terrestrial antenna 16. The RF tuner 18 selects a frequency bandwidth (channel) of digital audio to pass each of the RF signals (SAT1, SAT2, and TERR) within a tuned frequency bandwidth received by the antennas 14 and 16. The digital radio receiver 12 also includes a digital demodulator circuit 20 which receives analog signals output from tuner 18 and creates a digital time division multiplexed (TDM) data stream 22. The digital radio receiver 12 includes a source decoder circuit 24 that receives the time division multiplexed data stream 22 and selects the information contained in designated signal channels for both audio and data information contained within the data stream. The time division multiplexed data stream selection may occur prior to the source decoder circuit 24. The selected time division multiplexed digital channels containing the digital primary service audio information 26 are decompressed and passed on to an audio digital-to-analog converter 28 for outputting an analog audio output 29 for audio broadcast to passengers within the vehicle. The digital radio receiver 12 has a microcontroller 30 communicating with the RF tuner 18, digital modulator circuit 20, source decoder circuit 24, and audio digital-to-analog converter 28 by way of a communication bus.

The secondary service data including encrypted data 32 is separated from the primary service audio information at or before source decoder circuit 24. The digital radio receiver 12 of the present invention employs a data decryption circuit 36 for decrypting the encrypted data 32 as described herein. The data decryption circuit 36 receives the digital data including the encrypted data 32 from decoder circuit 24 and a key selection control signal 34 from microcontroller 30. By decrypting the encrypted data 32 with the use of decryption keys as described herein, selected secure data that is relevant to the receiver environment may be obtained and presented in data output 38 to the user of the digital radio receiver 12, such as a passenger in the vehicle 10.

Figure 2:
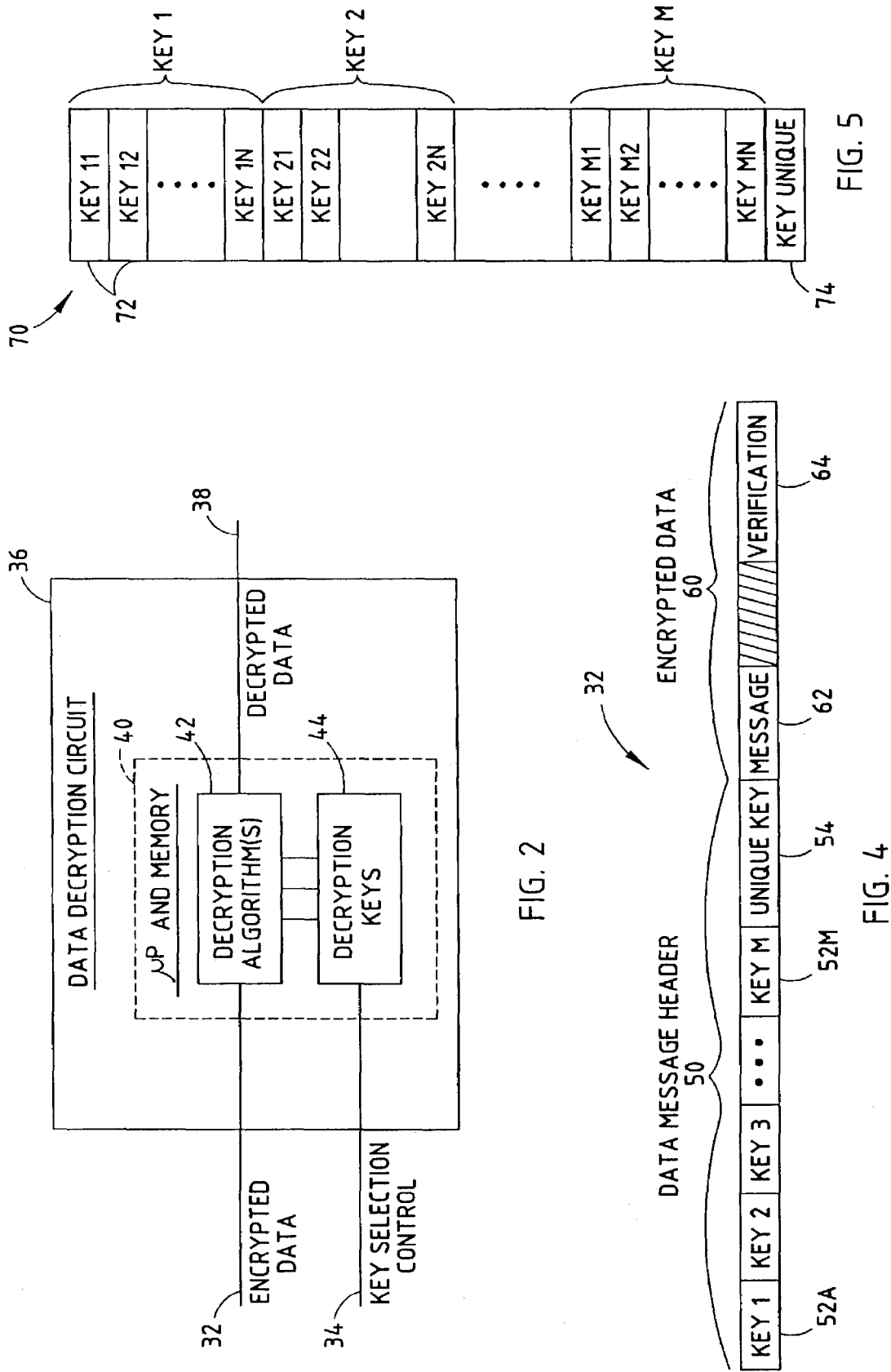
FIG. 2 is a block diagram illustrating a data decryption circuit in the radio receiver for decrypting encrypted messages.

Referring to FIG. 2, the data decryption circuit 36 is further illustrated including a microprocessor and memory 40. The microprocessor may include a conventional microprocessor having the capability for processing algorithms and data as described herein. The memory may include read-only memory (ROM), random access memory (RAM), flash memory, and other commercially available volatile and non-volatile memory devices. Stored and processed within the microprocessor memory 40 are one or more decryption algorithm(s) 42 and groups of decryption keys 44 as explained herein. The decryption keys 44 include groups of decryption keys that may be selected depending upon defined group criteria. According to one embodiment, the groups may include the vehicle manufacturer, the vehicle model, and the vehicle model year. Within each group of decryption keys, there are various individual decryption keys stored in memory which may be selected based on a unique identifier such as the vehicle identification number and/or receiver identification number.

Figure 3:
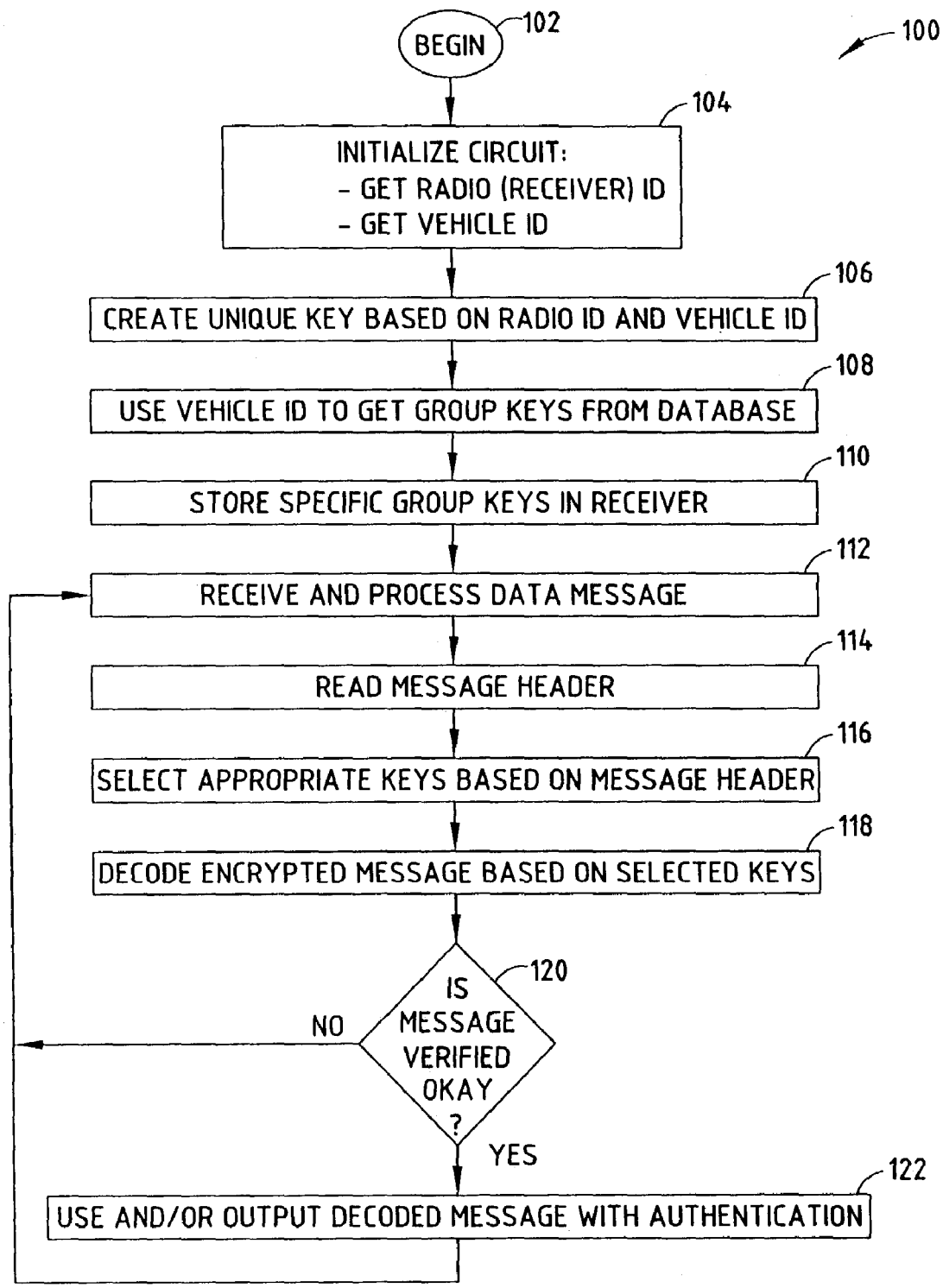
FIG. 3 is a flow diagram illustrating a method of decrypting the messages according to the present invention.

Referring to FIG. 3, a method 100 is illustrated for decrypting the encrypted data message according to the present invention. The method 100 begins at step 102 and initializes the data decryption circuit in step 104. The initialization of the data decryption circuit includes obtaining the radio (receiver) identification number (RIN) and the vehicle identification number (VIN), which are unique identifiers of the digital radio receiver and vehicle, respectively. The radio identification number may be obtained from the radio receiver itself, while the vehicle identification number may be obtained from a vehicle controller, such as the engine controller. Following the initialization step 104, method 100 creates a unique decryption key based on the radio identification number and the vehicle identification number in step 106. The unique decryption key may alternately be determined based on the vehicle identification number or radio identification number, instead of the combination. The unique decryption key is unique to the digital radio receiver, and allows for private decryption to communicate secure data to a single receiver.

The method 100 uses the vehicle identification number to obtain group keys from a database stored in non-volatile memory in step 108. According to one embodiment, the database is a lookup table as illustrated in FIG. 5 which includes a plurality of groups of decryption keys labeled group key 1 through group key M. Each of the group keys labeled key 1 through key M includes individual decryption keys 72. Within group key 1 are a plurality of decryption keys labeled key 11 through key 1N. Likewise, group key 2 includes a plurality of decryption keys labeled key 21 through key 2N. The Mth group key labeled key M similarly includes a plurality of decryption keys labeled key M1 through key MN. Within each group key, N may or may not be the same number.

It should be appreciated that each of the groups of keys labeled key I through key M includes selectable decryption keys based on a characteristic of the receiving environment, such as a characteristic of the vehicle and having different values based on predetermined variations of that characteristic. In one embodiment, one group of keys (e.g., the group labeled key 1) may be based on the vehicle manufacturer (e.g., key 11=Chevy, key 12=Pontiac, key 13=Saturn, key 14=Lincoln, key 15=Dodge, . . . , and key 1N=Ford). Another group of keys (e.g., the group labeled key 2) may be based on the model type of vehicle (e.g., key 21=Chevy Tahoe, key 22=Chevy Monte Carlo, . . . , and key 2N=Chevy Malibu). A further group of keys (e.g., the group labeled key M) may be based on the model year of the vehicle (e.g., key M1=1998, key M2=1999, key M3=2000, key M4=2001, key M5=2002, . . . , and key MN=2030). Other groups could include service providers who would target certain receivers based on any number of factors, such as home area, gender, or coupled service interface including telematics, navigation, local FM, etc. It should be apparent that (1) each key described above denotes a variation of a receiver environmental characteristic, (2) each receiver environmental characteristic divides the plurality of receivers into sets of receivers based on its own predetermined variations and (3) the sets of any one of these different environmental characteristics will generally overlap those of another. For example, the set of receivers installed in a Pontiac (key 12) overlaps the set of receivers having a Navigation system since, in addition to those receivers in both sets (those in a Pontiac also having a Navigation system), there may be receivers in each set that are not in the other, such as those in a Pontiac not having a Navigation system or those in a Dodge having a Navigation system. Thus, a powerful and efficient way is provided to target encrypted messages to predetermined overlapping sets of receivers based on shared variations of multiple receiver environmental characteristics.

Returning to FIG. 3, the method 100 stores specific group keys in the digital radio receiver in step 110. In step 112, method 100 receives and processes the data message. The data message is a data stream that is shown in FIG. 4, according to one example. The data message includes a data message header 50 and encrypted data 60 which includes a message 62. The data message header 50 includes non-encrypted data with key selectors 52A-52M that select which group keys are to be employed to decrypt the encrypted data 60. The data message header 50 may also contain message length message identification, and other unencrypted information that may be required to define the message. Each of the key selectors 52A-52M may include a binary bit of "0" or "1," with a binary bit "1" indicating use of the corresponding group key, and a binary bit "0" representing non-use of the corresponding binary key. Additionally, the data message header 50 includes a unique key indicator which indicates use of the key unique 74 stored in the digital radio receiver lookup table to communicate private secure messages. The encrypted data 60 includes an encrypted message 62 which, with the use of the appropriate decryption key(s), may be decrypted and presented to the vehicle and/or passengers. Additionally, the encrypted data includes a verification message 64 which verifies whether proper decryption of the data has been performed.

Returning to FIG. 3, method 100 selects the appropriate keys based on the message header in step 116. This is achieved by selecting the appropriate decryption key from the memory lookup table for each group key selector 52A-52M that has been set with a binary bit "1." The encrypted data message is then decoded based on the selected decryption keys in step 118. This includes applying known decryption techniques to decrypt the data message with the decryption algorithm associated with each selected decryption key. Proceeding to decision step 120, method 100 checks whether the decoded message is verified as okay by reading the decrypted verification message 64 and determining if the decryption was proper. The decrypted verification message may include a cyclic redundant code (CRC) type check. If the decoded message is verified as okay, method 100 uses and/or outputs the decoded message with authentication in step 122 before returning to step 112. If the message is not verified as okay, method 100 returns to step 112 without authentication. Authenticated messages are presented or made available to the vehicle and its passengers. If the message is not authenticated, the message may be ignored.

Figure 6:
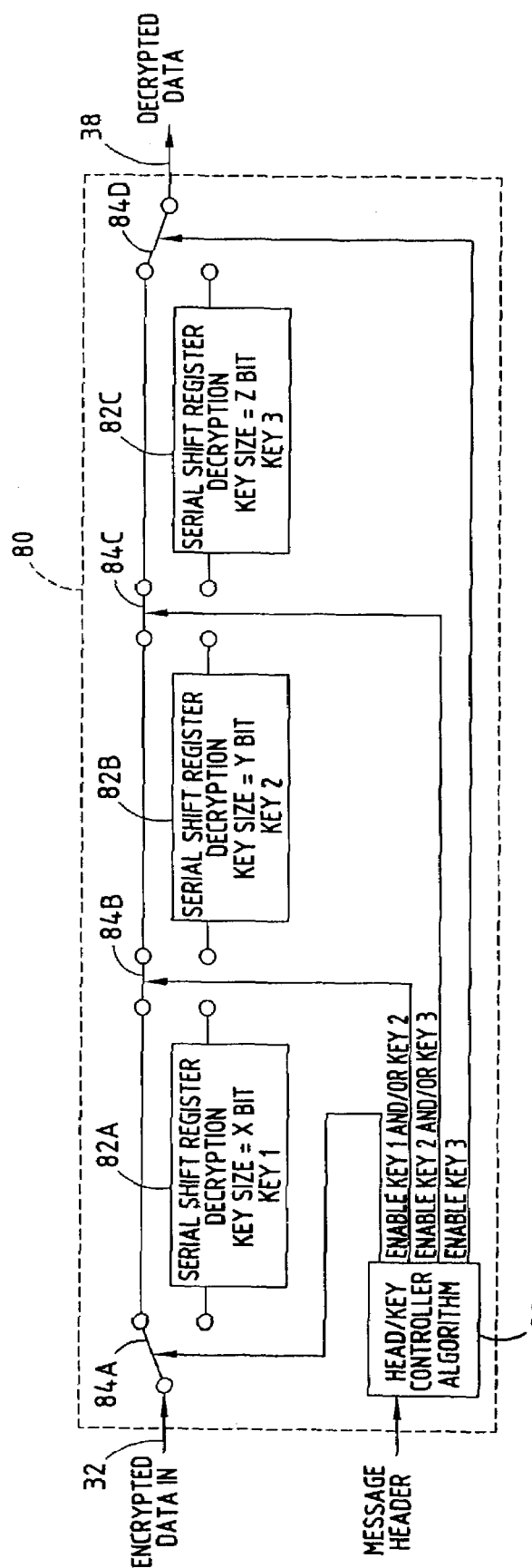
FIG. 6 is a block diagram illustrating decryption using a plurality of decryption keys according to one embodiment.

Referring to FIG. 6, one example of a decryption circuit 80 is illustrated therein including three serial connectable shift registers 82A-82C for selecting combinations of keys for decrypting the data message. The serial shift registers 82A-82C are interconnected via switches 84A-84D to connect combinations of decryption algorithms for key 1, key 2, and key 3, respectively, in series. The switches 84A-84D are controlled to selectively switch in or out each of the serial shift register algorithms 82A-82C by way of a header/key control algorithm 88. The header/key controller algorithm 88 may be processed by the microprocessor and memory 40.

Figure 7:
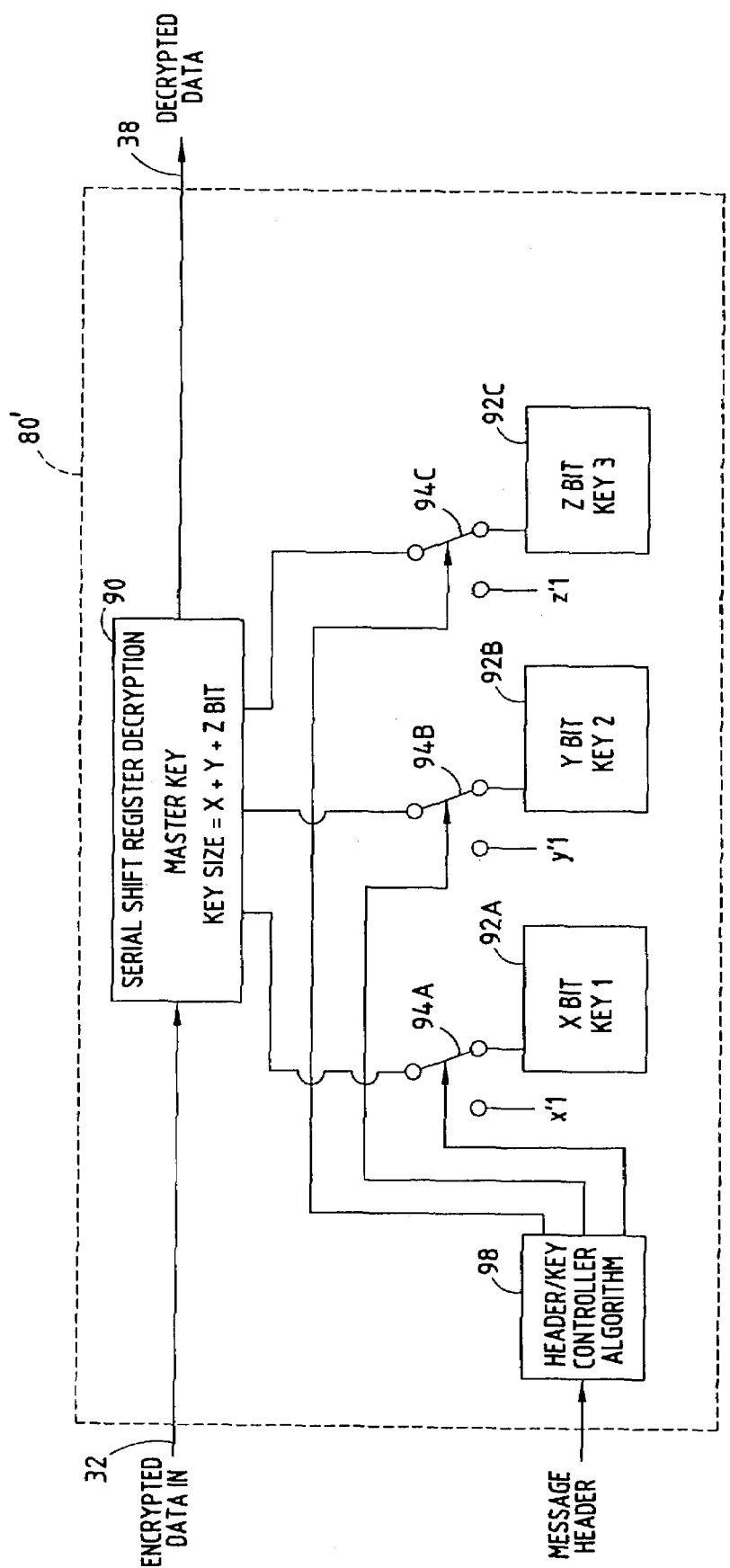
FIG. 7 is a block diagram illustrating decryption using a master decryption key according to another embodiment.

Referring to FIG. 7, a decryption circuit 80' is shown according to a second embodiment employing a master key algorithm 90. The master key algorithm 90 is made up of multiple shift registers 92A-92C that use the sum total of decryption key 1, key 2, and key 3, which are shown connected in parallel via switches 94A-94C. The switches 94A-94C are controlled by way of header/key controller algorithm 98 which may be processed by the microprocessor and memory 40. The decryption circuit 80' provides a single master key 90 as a summation of the individual decryption key 1 through key 3 to decrypt the data message according to known decryption techniques.

The use of a master key is shown in FIG. 7 may require a more complex algorithm due to a larger bit encryption, whereas using multiple keys as shown in FIG. 6 may use multiple, less complex algorithms. It should be appreciated that various decryption algorithms are known and may be associated with the master key and individual decryption keys as should be readily apparent to those skilled in the art. It should further be appreciated that the secure decryption keys can be constant or may change with time (rolling). With a rolling set of decryption keys, the data encryption may be more difficult to break. With a rolling set of keys, a time reading can be sent to the message header information to indicate what rolling key to use.

Accordingly, the receiver and method of the present invention advantageously decrypts data based on a selected group or groups of decryption keys that are relevant to a characteristic of the receiver environment. The receiver and method are particularly useful for use on a vehicle 10 for communicating secure messages with passengers in the vehicle.

In the vehicle application, a vehicle manufacturer is able to communicate secure data to passengers in the vehicle which pertain to a selected vehicle manufacturer, vehicle model, vehicle model year, and other designated group classifications, so as to target certain vehicles, while the broadcast message is ignored by vehicles which do not have the characteristics specified in the selected group. This allows for multiple levels of message control by content suppliers and does not require that hardware manufacturers have a predetermined decryption key in advance.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A digital radio frequency receiver for receiving and deciphering broadcast radio frequency signals containing secure information, the digital radio frequency receiver being a member of a common plurality of radio frequency receivers sharing a predetermined plurality of receiver environmental characteristics, wherein each one of the predetermined plurality of receiver environmental characteristics (1) has a plurality of variations and (2) divides the common plurality of radio frequency receivers into sets of radio frequency receivers based on its own variations, with each such set comprising a plurality of radio frequency receivers and the sets of radio frequency receivers so produced differing from and overlapping those produced by others of the predetermined plurality of receiver environmental characteristics, the digital radio frequency receiver comprising:

a data decryption circuit comprising a memory storing a plurality of separately selectable decryption keys, each of the stored decryption keys corresponding to a different one of the receiver environmental characteristics and having a value based on one of the variations of the one of the receiver environmental characteristics as determined by the environment of the digital radio frequency receiver;

an input for receiving a radio frequency signal comprising a data stream comprising an encrypted message and a plurality of key selectors, wherein (1) each of the included key selectors identifies a predetermined one of the plurality of receiver environmental characteristics, and (2) decryption of the encrypted message requires a decryption key corresponding to a predetermined variation of each identified receiver environmental characteristic; and the data decryption circuit further comprising a processor configured to select the stored decryption key corresponding to the receiver environmental characteristic identified by each of the key selectors included in the received radio frequency signal and use the selected decryption keys in decrypting the encrypted message, whereby successful decryption of the message occurs only when the variation of each of the receiver environmental characteristics required for decryption of the encrypted message matches the variation of the same corresponding receiver environmental characteristic as determined by the environment of the digital radio frequency receiver.

2. The digital radio frequency receiver as defined in claim 1 wherein the data decryption circuit further comprises a separate decryption module for each of the separately selectable decryption keys and serially applies the selected decryption keys to the message while bypassing the decryption modules of the group decryption keys that are not selected.

3. The digital radio frequency receiver as defined in claim 1 wherein:

the data decryption circuit includes a plurality of serial shift registers each incorporating one of the separately selectable decryption keys, a plurality of switches for selectively connecting ones of the plurality of serial shift registers in series; and the processor comprises a microprocessor configured with a header/key algorithm for controlling the plurality of switches responsive to the key selector of a received message to serially connect only the serial shift registers incorporating the selected decryption keys for decryption of the received message.

4. The digital radio frequency receiver as defined in claim 1 wherein the data decryption circuit includes a serial shift register, a memory storing the plurality of group decryption keys and a microprocessor responsive to the key selector of a received message to configure the serial shift register with a master key comprising the selected one or more group decryption keys for decryption of the message.

5. The digital radio frequency receiver as defined in claim 1 wherein the data decryption circuit comprises a plurality of serially connectable sub-circuits each providing decryption based on a different one of the stored decryption keys and switching apparatus responsive to the processor for serially connecting only ones of the plurality of sub-circuits providing the decryption keys specified by the key selector so that the message is decrypted in successive decryption algorithms each based on one of the stored decryption keys specified by the key selector.

6. The digital radio frequency receiver as defined in claim 5 wherein the sub-circuits comprise serially connectable shift registers.

7. The digital radio frequency receiver as defined in claim 1 wherein the data decryption circuit comprises a single register and additional circuitry configured to load the register with the decryption keys specified by the key selector in serial order to form a single master key for decrypting the message.

8. A method for decrypting an encrypted data stream in a broadcast radio frequency signal comprising the steps of:

defining a plurality of separately selectable decryption keys, each of the decryption keys corresponding to a predetermined variation of a different one of a predetermined plurality of receiver environmental characteristics, wherein each one of the predetermined plurality of receiver environmental characteristics (1) is shared by a common plurality of radio frequency receivers, (2) has a plurality of variations including the predetermined variation, and (3) divides the common plurality of radio frequency receivers into sets of radio frequency receivers based on its own variations, with each such set comprising a plurality of radio frequency receivers and the sets of radio frequency receivers so produced differing from and overlapping those produced by others of the predetermined plurality of receiver environmental characteristics;

in each of the common plurality of radio frequency receivers, storing a selected set of the plurality of separately selectable decryption keys, each of the stored decryption keys corresponding to a different one of the receiver environmental characteristics and having a value based on one of the variations of the one of the receiver environmental characteristics as determined by the environment of the radio frequency receiver in which it is stored;

in a selected one of the plurality of radio frequency receivers, receiving a broadcast radio frequency signal comprising a data stream including an encrypted message and a plurality of key selectors, wherein (1) each of the included key selectors identifies a predetermined one of the receiver environmental characteristics and (2) decryption of the encrypted message requires a decryption key corresponding to a predetermined variation of each identified receiver environmental characteristic;

selecting the stored decryption key corresponding to the receiver environmental characteristic identified by each of the key selectors included in the received signal; and using the selected decryption keys in decryption of the encrypted message, whereby successful decryption of the message occurs only when the variation of each of the receiver environmental characteristics required for decryption of the encrypted message matches the variation of the corresponding receiver environmental characteristic in the environment of the selected radio frequency receiver.

9. The method as defined in claim 8 wherein the step of using the selected decryption keys in decryption of the encrypted message comprises performing consecutive decryptions each based on one of the selected decryption keys.

10. The method as defined in claim 8 wherein the selected one of the plurality of radio receivers is adapted for mounting on a vehicle and at least one of the receiver environmental characteristics comprises at least one of a vehicle model type and a vehicle model year of the vehicle for which the receiver is adapted.

11. The method as defined in claim 8 further comprising the step of forming a master decryption key from the selected decryption keys, wherein the master decryption key is used to decrypt the message.

* * * * *